United States Patent
Paulraj et al.

(10) Patent No.: US 7,058,146 B2
(45) Date of Patent: *Jun. 6, 2006

(54) METHOD AND WIRELESS COMMUNICATIONS SYSTEMS USING COORDINATED TRANSMISSION AND TRAINING FOR INTERFERENCE MITIGATION

(75) Inventors: Arogyaswami J. Paulraj, Stanford, CA (US); Peroor K. Sebastian, New Delhi (IN); Jose Tellado, Stanford, CA (US); Robert W. Heath, Jr., Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 675 days.

This patent is subject to a terminal disclaimer.

(21) Appl. No.: 09/876,896

(22) Filed: Jun. 6, 2001

(65) Prior Publication Data
US 2002/0027957 A1 Mar. 7, 2002

Related U.S. Application Data

(63) Continuation of application No. 09/432,295, filed on Nov. 2, 1999, now Pat. No. 6,377,636.

(51) Int. Cl.
*H04L 1/02* (2006.01)
*H04B 7/10* (2006.01)
(52) U.S. Cl. .............. 375/347; 375/260; 375/267; 375/346; 370/328; 455/456.1; 455/457; 455/502
(58) Field of Classification Search ............ 375/260, 375/346, 347, 267, 376; 370/328, 342; 455/456.1, 455/457, 502
See application file for complete search history.

(56) References Cited

U.S. PATENT DOCUMENTS

| | | | | |
|---|---|---|---|---|
| 5,235,615 | A * | 8/1993 | Omura | 370/342 |
| 5,448,753 | A | 9/1995 | Ahl et al. | 455/33.1 |
| 5,819,168 | A | 10/1998 | Golden et al. | 455/303 |
| 5,828,659 | A * | 10/1998 | Teder et al. | 370/328 |
| 5,933,768 | A | 8/1999 | Skold et al. | 455/296 |
| 6,094,562 | A * | 7/2000 | Zhong | 455/67.16 |
| 6,275,705 | B1 * | 8/2001 | Drane et al. | 455/456.2 |
| 6,377,636 | B1 * | 4/2002 | Paulraj et al. | 375/346 |
| 6,731,622 | B1 * | 5/2004 | Frank et al. | 370/342 |

OTHER PUBLICATIONS

A.J. Paulraj, et al., "Space-Time Processing for Wireless Communications," IEEE Signal Processing Magazine, Nov. 1997, pp. 49-83.
Theodore S. Rappaport, "Smart Antennas, Adaptive Arrays, Algorithms, & Wireless Position Location".

* cited by examiner

*Primary Examiner*—Stephen Chin
*Assistant Examiner*—Ted M. Wang
(74) *Attorney, Agent, or Firm*—Michael A. Proksch

(57) ABSTRACT

A method for interference mitigation in a wireless communication system having multiple transmitters and receivers by introducing transmission time delays between the transmission of signals from the individual transmitters to ensure coherent reception of the signals at a specific point in the coverage area, such as at a center of distribution of the receivers. To further aid in interference mitigation the signals are assigned training patterns chosen to be distinguishable by the receiver and to optimize interference mitigation. The training patterns can be selected based on a feedback parameter, e.g., a measure of the quality of interference mitigation obtained from the receiver. The present method can be used in wireless communication systems which re-use frequencies including TDMA, CDMA, FDMA, OFDMA or other multiplex communication systems using a multiple access method or a combination of such methods.

25 Claims, 9 Drawing Sheets

METHOD AND WIRELESS COMMUNICATIONS SYSTEMS USING COORDINATED TRANSMISSION AND TRAINING FOR INTERFERENCE MITIGATION

CROSS-REFERENCE TO RELATED APPLICATIONS

This application is a continuation of U.S. application Ser. No. 09/432,295, filed Nov. 2, 1999, now U.S. Pat. No. 6,377,636.

FIELD OF THE INVENTION

The present invention relates generally to wireless communication systems and methods of operating such systems to mitigate interference with the aid of coordinated transmission and training.

BACKGROUND OF THE INVENTION

Wireless communication systems serving stationary and mobile wireless subscribers are rapidly gaining popularity. Numerous system layouts and communications protocols have been developed to provide coverage in such wireless communication systems.

Currently, most wireless systems are broken up into separate coverage areas or cells. Typically, each cell has a base station equipped with an antenna for communicating with mobile or stationary wireless devices located in that cell. A cellular network consists of a number of such cells spanning the entire coverage area. The network has an assigned frequency spectrum for supporting communications between the wireless devices of subscribers and base stations in its cells. One of the constraints on a wireless communication systems is the availability of frequency spectrum. Hence, any wireless system has to be efficient in using its available frequency spectrum.

It is well-known that attenuation suffered by electromagnetic wave propagation allows wireless systems to re-use the same frequency channel in different cells. The allowable interference level between signals transmitted in the same frequency channel determines the minimum separation between cells which can be assigned the same frequency channel. In other words, frequency channel re-use patterns are dictated by the amount of Co-Channel Interference (CCI) seen by the receiving unit (either the base station or the wireless subscriber device).

As an example of frequency re-use, FIG. 1 shows a portion or a cluster 10 of a typical wireless cellular system with a 7*3 re-use schedule, i.e., spatial channel re-use factor 7 and 3 sectors using different frequency channels in each cell 12. In the 7*3 case the available frequency spectrum is divided into 21 channels or sub-channels labeled by $f_1$, $f_2$, . . . , $f_{21}$. Frequencies $f_1$, $f_2 f_3$ are used in cell 12A, frequencies $f_4$, $f_5$, $f_6$ are used in cell 12B and so on. There is no frequency re-use within cluster 10.

FIG. 1B shows a system 14 built up of clusters 10. As can be seen, the closest cell which re-uses the same frequency channel is at least three cells away. This separation ensures that sufficient attenuation is experienced by the signals emitted in the cells of one cluster before reaching cells of the next cluster re-using the same frequencies in its cells to not impair communications. The capacity of system 14 is dictated by the bandwidth of the channels and the carrier-to-interference (C/I) ratio. The sustainable re-use structure, therefore, decides the spectral efficiency of the system which is measured in the amount of information transmitted per unit frequency per cell, commonly measured in bps/Hz/cell.

Clearly, high spectral efficiency is a desirable system characteristic. By reducing CCI the C/I ratio can be improved and the spectral efficiency increased. Specifically, improved C/I ratio yields higher per link bit rates, enables more aggressive frequency re-use structures (closer spacing between cells re-using the same frequency channels) and increases the coverage of the system.

It is known in the communication art that receiving stations equipped with antenna arrays, rather than single antennas, can improve receiver performance. Antenna arrays can both reduce multipath fading of the desired signal and suppress interfering signals or CCI. Such arrays can consequently increase both the range and capacity of wireless systems. This is true for instance of wireless cellular telephone and other mobile systems.

In mobile systems, a variety of factors cause signal corruption. These include interference from other cellular users within or near a given cell. Another source of signal degradation is multipath fading, in which the received amplitude and phase of a source varies over time. The fading rate can reach as much as 200 Hz for a mobile user traveling at 60 mph at PCS frequencies of about 1.9 GHz. In such environments, the problem is to cleanly extract the signal of the user being tracked from the collection of received noise, CCI, and desired signal portions summed at the antennas of the array.

In Fixed Wireless Access (FWA) systems, e.g., where the receiver remains stationary, the signal fading rate is less than in mobile systems. In this case, the channel coherence time (i.e., the time during which the channel estimate remains stable) is longer since the receiver does not move. Still, over time, channel coherence will be lost in FWA systems as well.

Antenna arrays enable the system designer to increase the total received signal power, which makes the extraction of the desired signal easier. Signal recovery techniques using adaptive antenna arrays are described in detail, e.g., in the handbook of Theodore S. Rappaport, *Smart Antennas, Adaptive Arrays, Algorithms, & Wireless Position Location*; and Paulraj, A. J et al., "Space-Time Processing for Wireless Communications", IEEE Signal Processing Magazine, November 1997, pp. 49–83.

Some of the techniques for increasing total received signal power use weighting factors to multiply the signal recovered at each antenna of the array prior to summing the weighted signals. Given that antenna arrays offer recognized advantages including greater total received signal power, a key issue is the optimal calculation of the weighting factors used in the array. Different approaches to weight generation have been presented in the art.

If the channels of the desired and interfering signals are known, the weight generation technique that maximizes the signal-to-interference-plus-noise ratio (SINR), as well as minimizes the mean squared error (MMSE) between the output signal and the desired output signal, is the well-known Weiner-Hopf equation:

$$w = [R_{xx}]^{-1} r_{xd},$$

where $r_{xd}$ denotes the crosscorrelation of the received signal vector x with the desired signal, given by:

$$r_{xd} = E[x^* d],$$

where d is the desired signal, and $R_{xx}$ is the received signal correlation matrix, which in turn is defined as:

$$R_{xx} = E[x^*x^T],$$

where the superscript * denotes complex conjugate and T denotes transpose.

Of course, this technique, also known as the beamforming approach, is only one of many. Other prior art techniques include joint detection of signal and interferers, successive interference canceling as well as space-time or space-frequency filtering and other techniques. More information about these techniques can be found in the above-cited references by Theodore Rappaport and Paulraj, A. J., as well as other publications.

Interference mitigation including CCI reduction for the purpose of increasing spectral efficiency of cellular wireless systems particularly adapted to a system using adaptive antenna arrays has been addressed in the prior art. For example, U.S. Pat. No. 5,819,168 to Golden et al. examines the problem of insufficient estimation of CCI and noise in communication channels which leads to an inability to suppress interference. In particular, Golden teaches to solve the problems associated with correct estimation of the $R_{xx}$ correlation matrix by an improved strategy for determining the weighting coefficients to modify $R_{xx}$ based on the ratio of interference to noise.

U.S. Pat. No. 5,933,768 to Sköld et al. addresses the problem of interference suppression with little knowledge of the interfering signal. This is done by detecting a training sequence or other portion of the interfering signal, estimating the interferer channel and using this information in a joint demodulation receiver. The training sequences come from a finite set of known training sequences. Furthermore, the training sequences of the interferers arrive at the receiver at undetermined times. The channel estimation is performed user by user and results in poor channel estimates of the interferers since their training sequences can overlap the higher powered random data sequence of the desired user signal.

In yet another communication system as taught in U.S. Pat. No. 5,448,753 to Ahl et al. interference is avoided. This is done by coordinating the direction and transmission times of the beams such that they do not cross. In this manner interference between switched beams in a network and especially between beams from adjacent base stations can be avoided. A significant effort has to be devoted to coordination between the users and the base stations in this scheme.

Unfortunately, the above-discussed and other methods to improve spectral efficiency by CCI suppression in wireless systems including adaptive antenna array systems do not exhibit sufficiently high performance. Thus, it would be desirable to improve interference suppression in wireless systems including systems using adaptive antenna arrays. In particular, it would be desirable to improve CCI suppression such that a higher rate of frequency re-use could be employed in wireless systems.

OBJECTS AND ADVANTAGES OF THE INVENTION

Accordingly, it is a primary object of the present invention to provide a method to mitigate the effects of Co-Channel Interference (CCI) and a wireless system adapted to practice this method.

It is a further object of the invention to provide for a sufficient level of CCI suppression to enable a higher frequency re-use in cellular wireless systems.

Yet another object of the invention is to adapt the method for use in wireless systems employing adaptive antenna arrays to further increase CCI suppression performance.

The above objects and advantages, as well as numerous other improvements attained by the method and apparatus of the invention are pointed out below.

SUMMARY

The objects and advantages of the invention are achieved by a method for interference mitigation in a wireless communication system having multiple transmitters and receivers. In a first embodiment of the method, at least a first transmitter and a second transmitter of the system transmit a first signal $S_1$ and a second signal $S_2$ respectively both at a frequency $f_1$. One of the receivers located within a coverage area receives first and second signals $S_1$, $S_2$. In accordance with the method a time delay is determined between reception at a specific point in the coverage area of the first and second signals $S_1$, $S_2$. Then, a transmission delay $\tau$ between the transmission of the first signal $S_1$ and the transmission of the second signal $S_2$ is introduced such that signals $S_1$, $S_2$ are received coherently at that specific point in the coverage area. Because of that, signals $S_1$, $S_2$ are received substantially coherently or even coherently (when the point is at the location of the receiver) by the receiver. This coherent reception aids in interference mitigation.

The specific point in the coverage area can be located at the position of the receiver and can be determined by ranging. Alternatively, the distribution of the receivers in the coverage area is examined and the center of their distribution is determined. The specific point in the coverage area is substantially coincident with the center of the distribution. Frequently, this point will be located on an axis of symmetry of the coverage area. For example, when the coverage area is a sector of a cell, the point can be located on the axis of symmetry of that sector.

Now, when first signal $S_1$ is the useful signal and signal $S_2$ is an interfering signal the method calls for estimating the channels of signals $S_1$, $S_2$ and applying a method of interference mitigation in recovering signal $S_1$. Depending on the system, the method of interference mitigation can include beamforming, joint detection, successive interference canceling, space-time filtering, space-frequency filtering or any other suitable technique or combination.

To further aid in interference mitigation, it is preferable that signals $S_1$, $S_2$ be assigned a first and a second training pattern respectively. The training patterns are chosen to be distinguishable by the receiver. Furthermore, the patterns are selected to optimize interference mitigation. In some embodiments the patterns can also be adapted to system operating parameters such as communication traffic volume. Additionally, the training patterns can be selected based on a feedback parameter, e.g., a measure of the quality of interference mitigation, obtained from the receiver.

The present method is preferably used in wireless communication systems which re-use frequencies such that the first and second transmitters transmit signals at the same set of predetermined frequencies $f_1, \ldots, f_n$. The method can be used in bidirectional communications, e.g., in the downlink and uplink.

A wireless system of the invention can re-use frequencies more aggressively. For example, in the downlink the transmitters can be base stations in two cells located in close proximity or even adjacent each other. The receiver can be a mobile or fixed wireless subscriber device. In the uplink the transmitters are typically wireless subscriber devices and the receiver can be a base station. In either case the wireless subscriber devices and the base stations can use antenna arrays to further aid in interference mitigation in accordance with known techniques.

The base stations can be controlled by a base station control, as is known in the art. In one embodiment, the base station control is responsible for introducing the transmission delay, τ.

The method of the invention can be used in any cellular wireless system which takes advantage of frequency re-use and seeks to reduce CCI. The method is particularly well-suited for use in systems which employ antenna arrays in its transmitters and receivers for interference mitigation. A wireless communication system employing the method of the invention has a mechanism for determining a time delay between reception of signals at the specific point in the coverage area. It also has a coordinating mechanism for introducing the transmission delay τ. The wireless system can be a Time Division Multiple Access system (TDMA), Code Division Multiple Access (CDMA), Frequency Division Multiple Access (FDMA) or other multiplex communication systems using a multiple access method or a combination of such methods.

The base station control or even the master station control of the wireless system have the necessary mechanisms or circuitry for performing the functions called for by the method, such as the coordinating mechanism for introducing transmission delay τ. In addition the base station control can have a training unit for assigning the training patterns.

Preferably, an analyzer is provided for analyzing the interference between the signals at the receiver. In fact, the analyzer is preferably a part of the receiver. In any event, it is preferable that the analyzer and the training unit are in communication and that the analyzer generate a feedback parameter indicating a quality of interference mitigation. This feedback is sent to the training unit which uses it in assigning training patterns.

In another method of the invention the training patterns are assigned to the signals and the coordinated reception at the receiver is such that the training patterns are received coherently at the specific point in the coverage area and substantially coherently by the receiver. This method can be implemented in a wireless system equipped with a training unit for assigning the training patterns, as described above. A detailed description of the invention and the preferred and alternative embodiments is presented below in reference to the attached drawing figures.

DETAILED DESCRIPTION

Figure 1A:
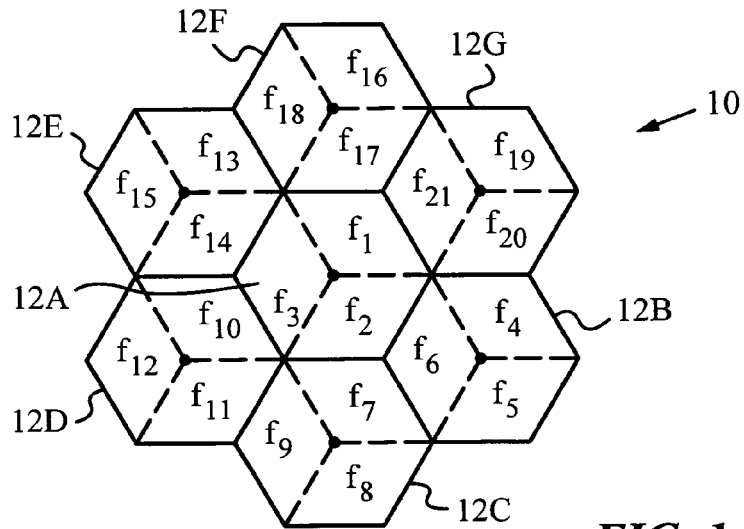
FIG. 1A (Prior Art) is a diagram showing a typical cluster of cells.
Figure 1B:
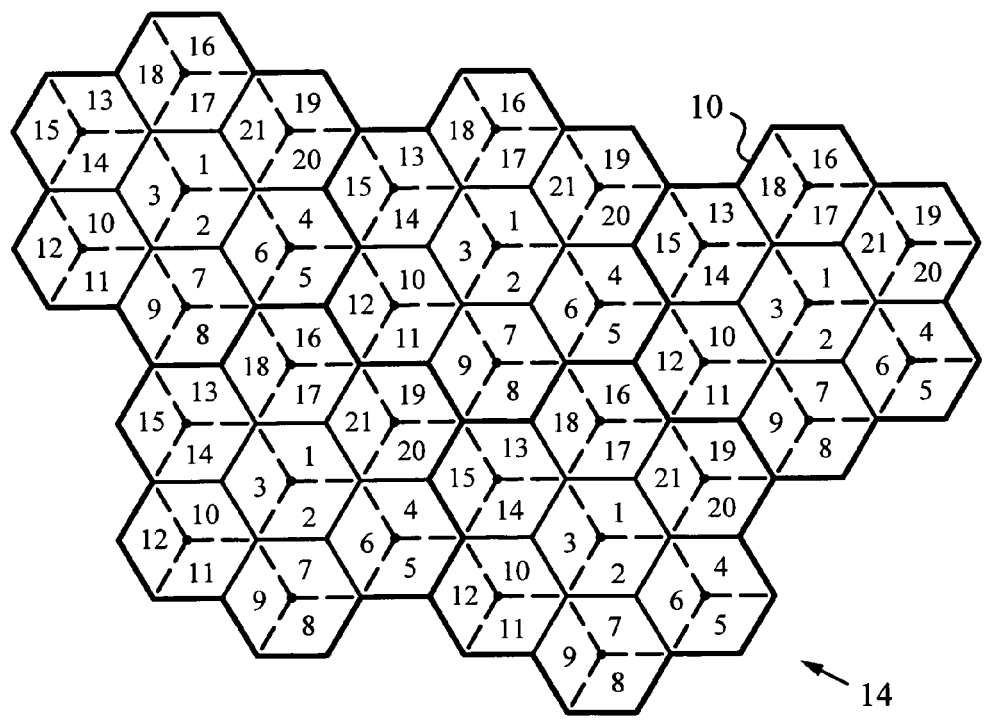
FIG. 1B (Prior Art) is a diagram of a wireless system composed of cell clusters as shown in FIG. 1A.
Figure 2:
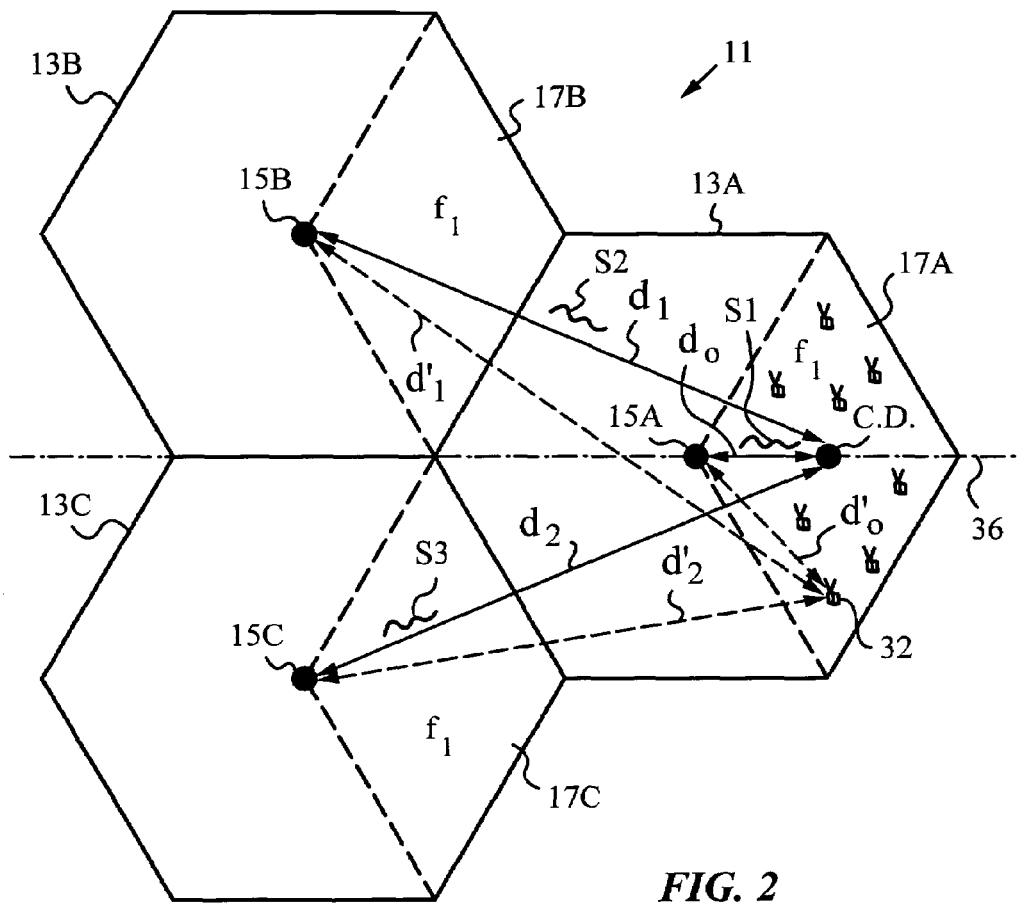
FIG. 2 is a diagram illustrating signal delay times in a number of cells.

The method of coordinated transmission to ensure substantially coherent reception of signals in accordance with the invention will be best understood by first reviewing a portion of a wireless system 11 having three cells 13A, 13B, 13C with corresponding base stations 15A, 15B, 15C as shown in FIG. 2. Base stations 15A, 15B, 15C transmit signals $S_1$, $S_2$, $S_3$ at the same frequency $f_1$ within sectors 17A, 17B, 17C. A receiver 32, which can be a fixed or mobile wireless device is shown in sector 17A.

Figure 3A:
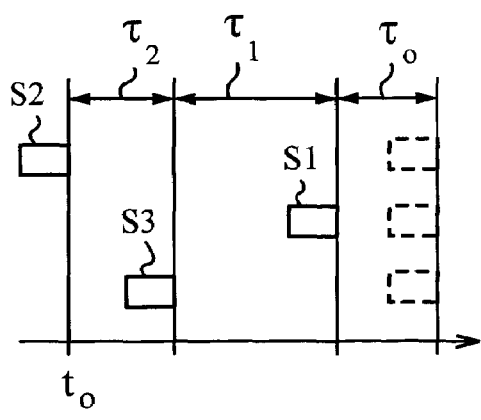
FIGS. 3A&B are timing diagrams indicating appropriate transmission times in the cells of FIG. 2.

For coherent reception of signals $S_1$, $S_2$, $S_3$ at receiver 32, proper transmission delays $\tau_0$, $\tau_1$, $\tau_2$ have to be introduced at base stations 15A, 15B, 15C. Specifically, in the position shown receiver 32 is at distances $d'_0$, $d'_1$ and $d'_2$ from base stations 15A, 15B, 15C respectively. Thus, for coherent reception, transmission delays $\tau_0$, $\tau_1$, $\tau_2$ are calculated based on those distances and introduced as shown in the diagram of FIG. 3A.

Figure 3B:
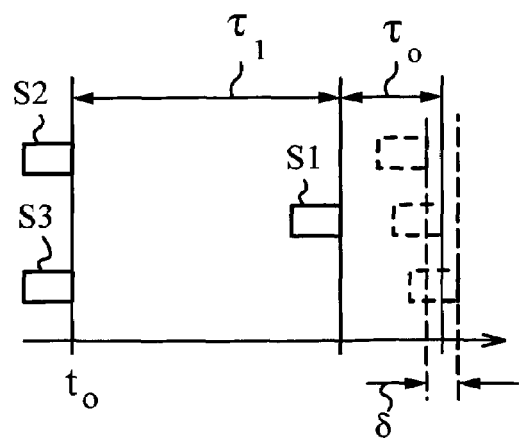

In practice, receiver 32 is only one of a number of receivers (fixed or mobile) distributed throughout sector 17A. In fact, in a typical situation the distribution of receivers throughout sector 17A is uniform or nearly uniform. Sector 17A has an axis of symmetry 36 and for a uniformly distributed set of receivers a center of the distribution, C.D., lies on axis 36 at the geometrical center of sector 17A as shown. The distances from base stations 15A, 15B, 15C to C.D. are $d_0$, $d_1$ and $d_2$ respectively. For coherent reception of signals $S_1$, $S_2$, $S_3$ at C.D. the transmission delays which have to be introduced are shown in the diagram of FIG. 3B.

Arranging for the transmission delays to be such that coherent reception is ensured at C.D. improves reception for all receivers in sector 17A. Of course, receivers closest to C.D. enjoy the highest reception coherence. All receivers receive signals $S_1$, $S_2$, $S_3$ substantially coherently or within a short time δ, as shown in FIG. 3B for receiver 32. Of course, as the distribution of receivers changes, especially when receivers are all mobile receivers, C.D. will tend to move somewhat. If sufficient computational capacities are provided, then the movement of C.D. can be tracked and taken into account to continuously maintain the best reception coherence for the largest number of receivers. Additionally, the cells may not be symmetrical, as shown, and more than just three cells or rather signals from more than three base stations have to be taken into account to achieve sufficient interference mitigation.

Figure 4:
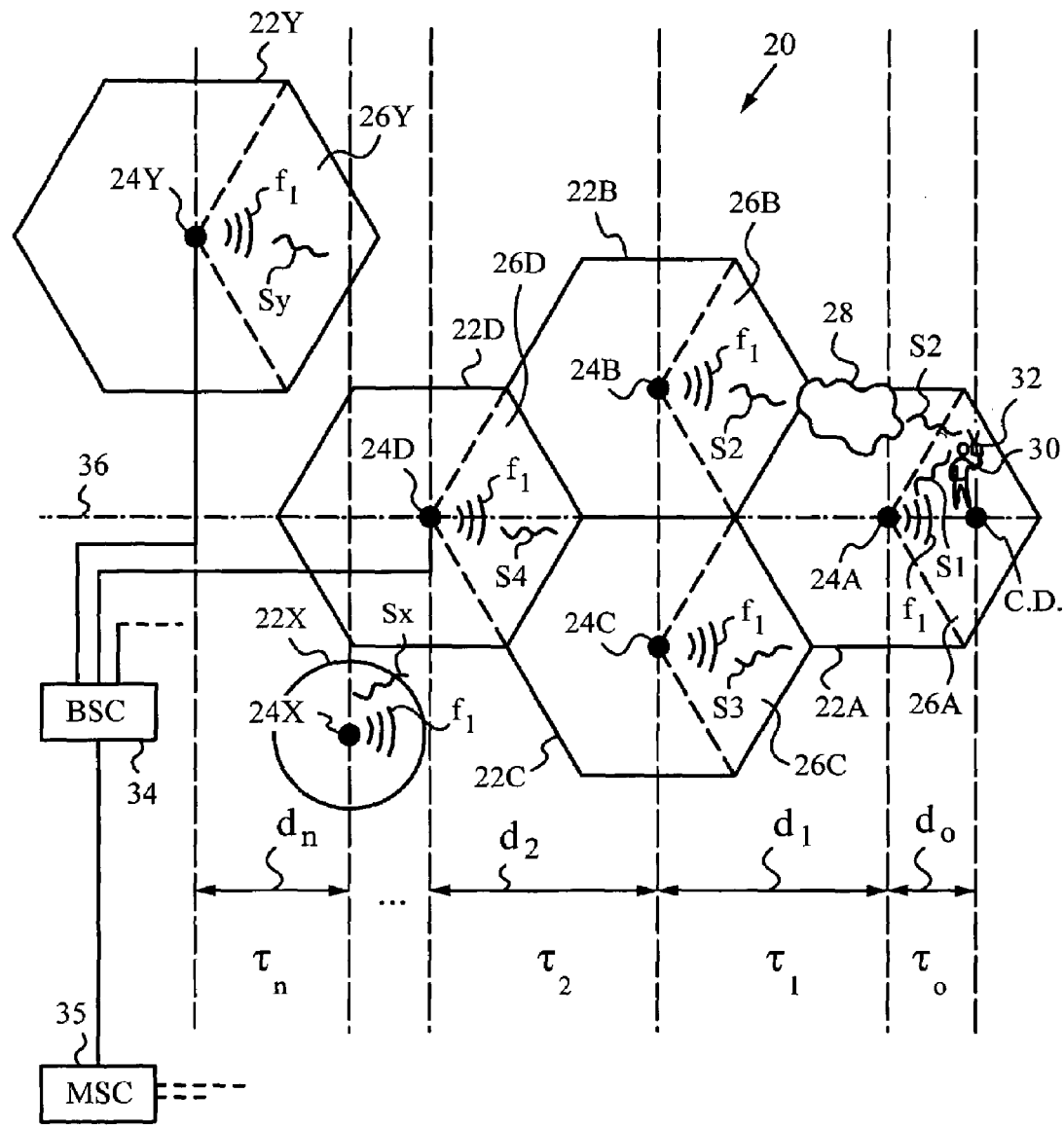
FIG. 4 is a diagram illustrating a generalized wireless system utilizing the method of the invention.

In fact, a generalized wireless system 20 employing the method of the invention in the downlink is shown in FIG. 4 to further clarify the method of the invention. System 20 has a number of cells, 22A, 22B, . . . , 22X, 22Y within which radio coverage is provided by corresponding transmitting units or base stations 24A, 24B, . . . , 24X, 24Y with requisite transmission devices, e.g., antennas. Cell 22X in this example is a supercell, with its base station 24X antenna positioned at a location providing line-of-sight communication for most signals. For example, base station 24X antenna can be placed on a mountain top or on a high building structure. Remaining cells are standard cells which are subject to multi-path propagation of signals. Of course, any given cell can have more than one base station, or it can consist of several micro-cells with independent re-transmission units in communication with the base station. Also, the cells can be of different spatial extent. The base stations can in principle include any types of fixed or mobile base stations, or ad hoc base stations. Alternatively, any of the base stations can be mounted on any suitable platform such as a satellite, terrestrial balloon, spaceship, etc. For simplicity these possibilities and corresponding adaptations are not shown in FIG. 4 but they will be apparent to a person skilled in the art.

Base stations 24A, 24B, . . . , 24X, 24Y can send out communication signals in various frequency channels centered at corresponding center frequencies (sometimes also referred to as sub-channels) within the bandwidth or spectrum assigned to system 20. For simplicity, the frequency channels will be referred to herein by their center frequencies or just frequencies.

In system 20 base stations 24A, 24B, . . . , 24Y preferably use antenna arrays or directional antennas which transmit at frequency $f_1$ within sectors 26A, 26B, . . . , 26Y. The remaining areas of cells 24A, 24B, . . . , 24Y may or may not be subdivided into sectors and can communicate at other frequencies which may or may not be re-used. Of course, not all antennas have to be directional, e.g., the antenna of base station 24X is omnidirectional and communicates at $f_1$ within its entire coverage area.

System 20 employs a frequency re-use scheme such that signals $S_1, S_2, \ldots, S_x, S_y$ are transmitted at the same frequency $f_1$. In fact, each of these signals $S_1, S_2, \ldots, S_x, S_y$ may itself represent a group of useful signals, e.g., $S_{1a}, S_{1b}, \ldots$ etc. when single base multiplexing is enabled. A person of average skill in the art will realize how to adopt the method and system of the instant invention in such situations. For purposes of clarity, however, these multiplexing options are not explicitly discussed herein.

Depending on the cell and sector in which a signal is received, it is either a useful signal or an interfering signal (interferer) contributing to CCI. In the simplest case, signal $S_1$ is a useful signal in sector 26A of cell 22A, but signals $S_2, S_3, \ldots, S_x, S_y$ are all interfering signals in sector 26A of cell 22A. In general, however, any subset of signals $S_1, S_2, \ldots, S_x, S_y$ can represent the useful signal and the remaining subset of received signals can represent the interferers, as will be apparent to a person skilled in the art familiar with spatial multiplexing techniques. For example, spatial multiplexing can be employed to provide communication of numerous signals in the same allocated bandwidth as described in U.S. Pat. No. 5,345,599. In the embodiment shown in FIG. 4 only one useful signal in each sector is shown for the sake of clarity.

In the simple scenario discussed here, although attenuation of electromagnetic radiation provides for attenuation of signals $S_2, S_3, \ldots, S_x, S_y$ according to the distance they propagate to reach cell 22A, any or all of these signals can arrive in sector 26A of cell 22A by a direct or multi-path route at a sufficient signal strength to represent CCI. The route or channel 28 of signal $S_2$ from sector 26B of cell 22B to sector 26A of cell 22A is indicated in FIG. 4. Signals $S_3, S_4, \ldots, S_y$ also propagate to sector 26A in their respective channels (not shown).

A cellular user or subscriber 30 with wireless subscriber device 32 such as a mobile, portable or stationary unit, in this case a mobile cellular telephone operating in sector 26A receives all signals $S_1, S_2, \ldots, S_y$. To device 32 signal $S_1$ is the useful signal and signals $S_2, S_3, \ldots, S_y$ are interferers. Interference can be mitigated by employing any suitable scheme such as, beamforming, joint detection, successive interference canceling, space-time filtering, space-frequency filtering or any other suitable technique or combination. For example, in the beamforming method a received signal correlation matrix $R_{xx}$ contains information of the routes or channels for each of the interferers $S_2, S_3, \ldots, S_y$ as well as the useful signal $S_1$. It is known that if the elements of the correlation matrix $R_{xx}$ are known, i.e., if all channels are known, then the channels carrying the undesired signals can be canceled out. In the joint detection case the useful signal and interferers are detected jointly in a similar fashion using knowledge of the channels. After detection the interfering signals are removed and the useful signal(s) is kept.

Signals from cells closest to cell 22A, i.e., adjacent cells 22B, 22C, as well as cells directly aligned with cell 22A, e.g., cell 22D along axis 36 will be least attenuated. Hence, signals $S_2$, $S_3$, and $S_4$ will contribute the most to CCI in sector 26A of cell 22A. Signals from further away along axis 36, e.g., cell 22X and further laterally offset from axis 36, e.g., cell 22Y will contribute less to CCI. In other words, signals $S_x, S_y$ will contribute less to CCI in sector 26A of cell 22A. For best communication performance between base station 24A and subscriber unit 32, however, any interferer received by unit 32 should preferably be mitigated.

Figure 5A:
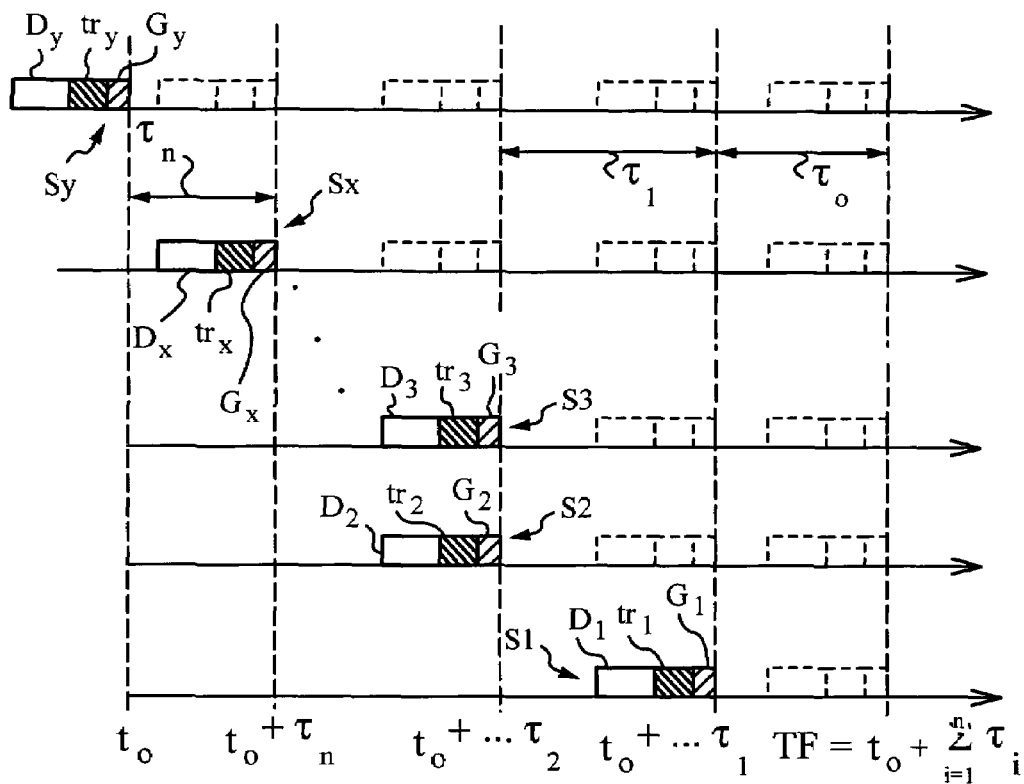
FIG. 5A is a timing diagram illustrating the signal transmission delays used for coherent reception at the distribution center.

System 20 can use any suitable communication protocols for formatting the data contained in signals $S_1, S_2, \ldots, S_y$ it transmits from base stations 24A, 24B, . . . , 24Y. A base station control (BSC) 34 and a Master Station Control (MSC) 35 which controls BSC 34 and any other BSCs (not shown) of system 20 control the transmission of signals $S_1, S_2, \ldots, S_y$. In accordance with the method, transmission delays are introduced by base stations 24A, 24B, . . . , 24Y under supervision of BSC 34 and/or MSC 35 such that all signals are received coherently at C.D. in sector 26A. This is shown in the diagram of FIG. 5A. As a result, receiver 32 receives signals substantially coherently or within a time δ as shown in the diagram of FIG. 5B.

Substantially coherent reception of signals within time δ in and of itself results in improved interference mitigation and reduced inter-symbol interference. It should be noted that guard intervals G of signals $S_1, S_2, \ldots, S_y$ should preferably be kept longer than δ, because of multi-path and other effects which can broaden time δ.

In a particularly advantageous embodiment of the method each signal $S_1, S_2, \ldots, S_y$ is additionally provided with a training pattern, or in this case a training sequence, tr. The actual form of the training pattern or sequence will depend on the type of system 20 and signal coding. In the case where each of the signals $S_1, S_2, \ldots, S_y$ represents a group of signals, each group will need multiple training patterns. The type of training pattern for each constituent signal in each of these groups will vary depending on the type of operation. The multiple signals in each group could, for example, represent diversity streams, multiplexing streams, etc. Multiplexing streams in particular may need longer duration of training sequences (or patterns) than those required for diversity streams to ensure similar accuracy of channel estimates. In case of single carrier modulation schemes, the training pattern can be, for example, a sequence of symbols or bits. But in case of multi-carrier modulation schemes such as OFDM, the training pattern may comprise a set of frequency tones which are chosen out of the available tones in such a way that the individual tones in the set are orthogonal to each other. In this case the orthogonality between such two different training patterns or frequency tone sets can be ensured by choosing the correct constituent tones in those two sets. In the single carrier case, orthogonality between two training sequences depends on the cross-correlation between them at the receiver. A person of average skill in the art will realize what particular training patterns should be used in any particular wireless system.

Figure 5B:
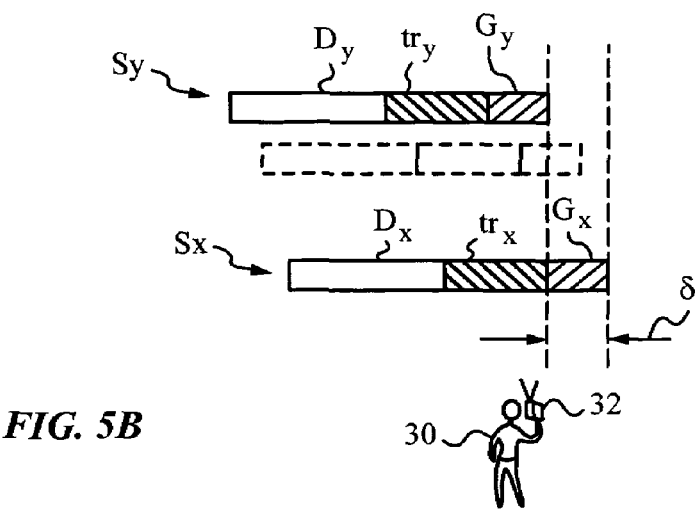
FIG. 5B is a timing diagram illustrating an acceptable delay in receiving the signals at a mobile receiver.

In the case shown in FIGS. 5A and 5B single carrier transmission is assumed and the training patterns are simple training sequences $tr_1, tr_2, \ldots tr_y$. Because of the coordinated transmission of signals, the training sequences are received substantially coherently by device 32. In fact, thanks to the presence of guard intervals G, discussed below, the receipt of training sequences can be compensated for time δ. Such coherent reception of training patterns $tr_1, tr_2, \ldots tr_y$ further aids in interference mitigation. In this case, BSC 34 is in communication with base stations 24A, 24B, ..., 24Y of system 20 and with subscriber units, such as subscriber unit 32 assign training sequences $tr_1, tr_2, \ldots, tr_y$ to signals $S_1, S_2, \ldots, S_y$. The components performing this assignment will be discussed below.

The time delays with which signals $S_1, S_2, \ldots, S_y$ arrive at C.D. are calculated using the known propagation speed (c=speed of light) of the electromagnetic signals and the known distances $d_1, d_2, \ldots, d_n$. Of course, even if the base stations were mobile, these distances can be periodically re-computed to determine the time delays e.g., by ranging or other distance determination techniques known in the art. In fact, ranging from any base station or even subscriber unit 32 can be used at any point in time to re-confirm or determine distances $d_1, d_2, \ldots, d_n$. It should be noted that delay times between base stations can be unequal if the cells of system 20 are not of the same size and thus the distances along axis 36 between successive base stations are unequal.

In the generalized case shown in FIG. 4 signals $S_2$ and $S_3$ experience a time delay $\tau_1$ in propagating to base station 24A and another time delay $\tau_0$ before being received at subscriber unit 32. For signal $S_y$, which is still sufficiently strong in sector 26A to interfere with signal $S_1$ and requires CCI interference mitigation, the total time delay is $\tau_0+\tau_1+\tau_2+\ldots+\tau_n$. Clearly, it is only necessary to determine time delays for signals which contribute to CCI.

For coherent reception of signals $S_1, S_2, \ldots, S_y$ and in particular of their training sequences at subscriber unit 32, the time δ has to be taken into consideration. The guard intervals $G_1, G_2, \ldots, G_y$ of duration at least equal to δ are added to signals to compensate for time δ. The use of guard intervals or bits is well-known in the art. FIGS. 5A and 5B illustrate the formatting of signals in generalized system 20 of FIG. 4. Specifically, signals $S_1, S_2, \ldots, S_y$ are broken up into three main constituent portions, namely their guard intervals $G_1, G_2, \ldots, G_y$, their training sequences $tr_1, tr_2, \ldots, tr_y$ and their payload or data portions $D_1, D_2, \ldots, D_y$.

Because the total time of flight (TF) of signal $S_y$ to unit 32 is the longest, $S_y$ is transmitted first at time $t_0$. Signal $S_x$ is transmitted after a transmission delay $\tau_n$ at which time signal $S_y$ has already propagated distance $d_n$ (see FIG. 4). In other words, $S_x$ is transmitted at $t_0+\tau_n$ and approximately in sync with signal $S_y$ indicated in dashed lines at $t_0+\tau_n$. After transmitting intervening signals (not shown) in the same manner, signals $S_2, S_3$ are transmitted at time $t_0+\tau_n+\ldots+\tau_2$ and is finally transmitted at time $t_0+\tau_n+\ldots+\tau_1$.

The above staggered transmission scheme or walking across scheme ensures that signals $S_1, S_2, \ldots, S_y$ are received coherently at time $$TF = t_0 + \sum_{i=0}^{n} \tau_i$$

at C.D. and substantially coherently at unit 32, as indicated in dashed lines. More importantly, this scheme with additional compensation offered by guard intervals $G_1, G_2, \ldots, G_y$ ensures that training sequences $tr_1, tr_2, \ldots, tr_y$ are available to unit 32 simultaneously.

In accordance with one embodiment of the invention, simultaneous reception of training sequences $tr_1, tr_2, \ldots, tr_y$ enables unit 32 to determine the channels of signals $S_1, S_2, \ldots, S_y$ by obtaining accurate channel estimates. In other words, unit 32 can now determine the received signal correlation matrix $R_{xx}$ and $r_{xd}$ and successfully use, e.g., the beamforming technique for interference mitigation. Once matrix $R_{xx}$ and $r_{xd}$ are known, CCI can be mitigated. Of course, unit 32 can also use any of the other interference mitigation techniques mentioned above.

It is known in the art that training patterns used will impact how well the channel of the corresponding signal can be determined. In general, longer training sequences or more dense training patterns will ensure better channel estimation. On the other hand, excessively long training sequences or dense training patterns take bandwidth away from the payload. Thus, in general, training patterns should be chosen to yield sufficiently good channel estimates for interference mitigation but not unduly limit the payload size.

Figure 6:
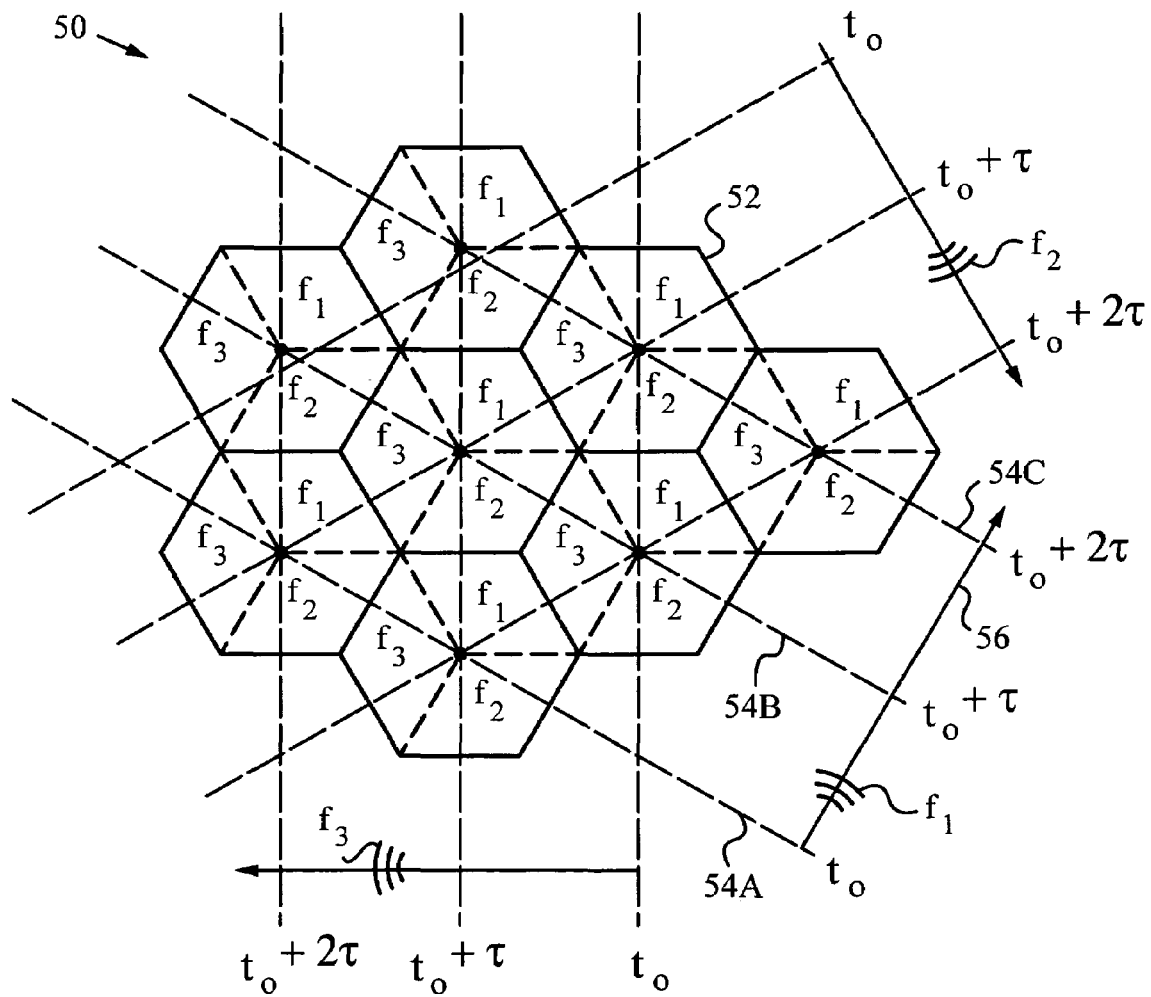
FIG. 6 is a diagram of a wireless system utilizing the method of the invention to increase frequency re-use.

The above generalized description illustrates the basic principles of the method and system of the invention. These principles can be adapted to various wireless data transmission protocols and wireless systems. For example, the method of the invention can be used in a time division multiple access (TDMA) network 50, a portion of which is shown in FIG. 6. Because this system employs the method of invention for CCI mitigation a more aggressive frequency re-use schedule is applied in network 50. In particular, the available spectrum is subdivided into only three sub-channels $f_1, f_2,$ and $f_3$ which are re-used in three sectors of each cell 52 as shown. In the figure, cells 52 are regularly spaced and of the same size, such that the distances between their centrally positioned base stations are constant. Hence, the delay times and the necessary transmission delays τ are all equal. A person skilled in the art will recognize that in practice there will be deviations in cell sizes and thus delay times may not be equal.

In order to ensure substantially coherent reception by the receivers of signals and/or their training sequences, each of the base stations has to introduce a transmission delay τ in the manner described above. For signals transmitted at $f_1$ along a direction of orientation 56 of sectors operating at $f_1$ signals are transmitted from the most remote base station row 54A which will produce CCI first at time $t_0$. Then, signals are sent at time $t_0+\tau$ from the next row 54B of base stations which will produce interference. Finally, at time $t_0+2\tau$ signals are sent from the last row 54C of base stations which transmit useful signals to subscriber units in the corresponding cells. Preferably, this staggered transmission or walking across network 50 scheme is performed across the entire network 50. The same walking across scheme is utilized in transmitting signals at frequencies $f_2$ and $f_3$.

Figure 7:
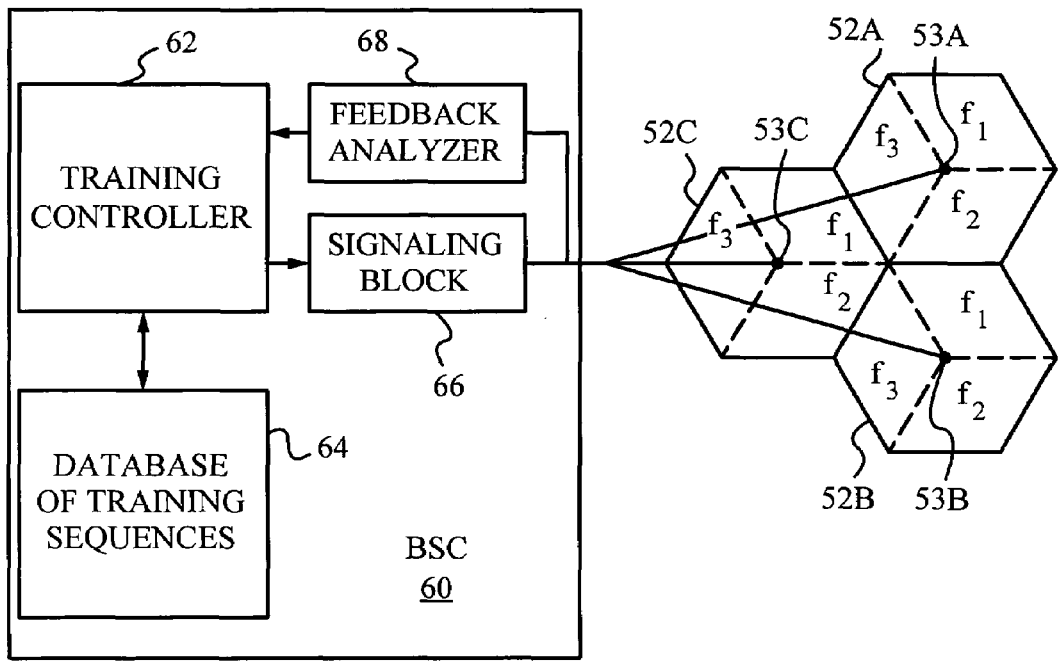
FIG. 7 is a block diagram of a base station control for operating a wireless network employing the method of the invention.

FIG. 7 illustrates a Base Station Control (BSC) 60 and/or Master Switching Center (MSC) which can be used to control part of network 50. Only three cells 52A, 52B, 52C of network 50 are shown for clarity, but it is understood that BSC 60 and/or MSC as well as any additional BSCs are appropriately connected, as is known in the art, to control all cells 52 of network 50. In particular, BSC 60 is connected to base stations 53A, 53B, 53C of cells 52A, 52B, 52C.

BSC 60 has a training coordinator or controller 62 and a database of training patterns 64. Controller 62 is connected to database 64. The set of training patterns in database 64 can be different for different re-use structures and cellular layouts while taking into account the changing interference scenario. For example, training patterns can be different time sequences such as Walsh codes in case of system 50 which is a single carrier system. A person of average skill in the art will recognize that other codes can be used depending on the type of communication network. For example, different sets of frequency tones can be used as training patterns in Orthogonal Frequency Division Multiplex (OFDM) systems. In fact, any orthogonal or other training patterns which are distinguishable at the receiver and which aid in effective channel estimation of the interferers can be employed.

BSC 60 communicates the selected training sequences to base stations 53A, 53B, 53C through a signaling block 66. Base stations 53A, 53B, 53C then use these training sequences in the signals they transmit to the subscriber units operating in their respective cells 52A, 52B, 52C. For example, training sequences for all frequencies $f_1$, $f_2$, $f_3$ used in cells 52A, 52B, 52C are of the same length and are selected from the group of Walsh code sequences.

Alternatively, the lengths and types of training sequences can be adjusted based on communication traffic volume. For instance, when no traffic exists in cell 53C in the sector operating at $f_1$ then no signals are being transmitted from it and hence no signals from that sector contribute to CCI in any other cells, e.g. in the $f_1$ sector of cell 53A. Therefore, if system 50 is an OFDM system, then no training patterns are required by base station 53C for the $f_1$ sector, since no signals are transmitted there. In other systems any training sequences can be kept short and the training periods long. The bandwidth which would have been allocated to the corresponding training sequence can thus be allocated to training sequences used in other cells to allow more precise channel estimation or can be used to increase the signal payloads in other cells.

On the other hand, when the traffic volume in the sector at $f_1$ in cell 52C is high, its signals will have a major contribution to CCI in other cells, e.g., in the sector at $f_1$ in cell 52A. Hence, preferably a long training sequence is assigned by training controller 62 to the $f_1$ sector in cell 52A to enable subscriber units in other cells to obtain a sufficiently good estimate of these signals for interference mitigation. It is well-known to those skilled in the art that increasing the amount of training or the training sequence and decreasing the period of training, e.g., the times between training sequences, can improve the accuracy of the channel estimate.

The performance of interference mitigation for any particular set of assigned training sequences is preferably monitored. In this case BSC 60 has a feedback analyzer 68 for receiving performance feedback information from base stations 53A, 53B and 53C. Preferably, analyzer 68 receives the signal quality feedback from the subscriber units through their respective base stations, analyzes them and passes on the results to training controller 62. The monitoring can be performed continuously or periodically. The signal quality information can simply be a channel or link quality indication, such as individual signal strength, relative signal strength amongst other signals or the mean square error of the respective channel estimate. Feedback analyzer's 68 report to training controller 62 on the link quality can be used for determining re-assignment of training sequences by training controller 62 when the link quality drops below an acceptable threshold.

Figure 8:
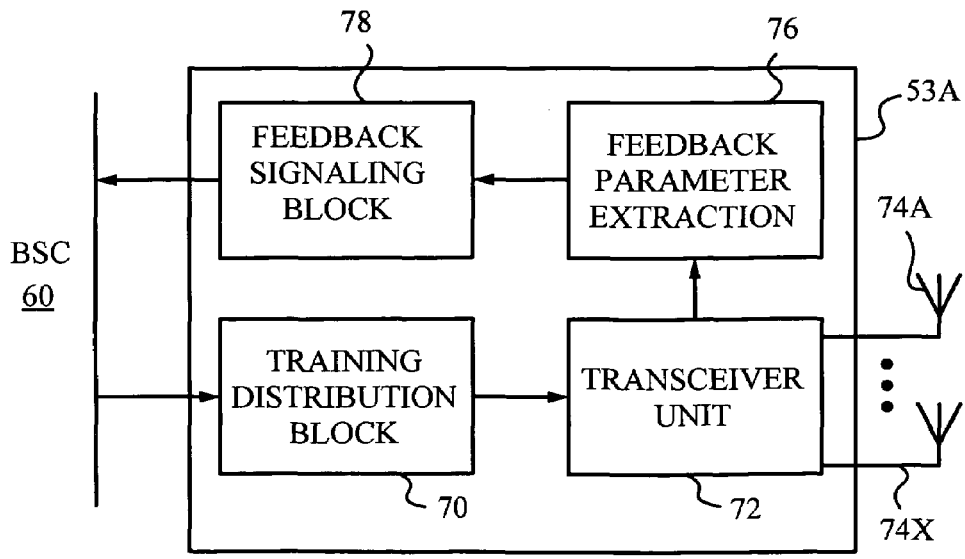
FIG. 8 is a block diagram of a base station of a cell from the network of FIG. 7.

Of course, subscriber units operating in network 50 have to be told what training sequences are used by the useful signal and the interferers so that after coherently receiving the signals and training sequences they can cancel out the interferers. For this purpose, the base stations communicate the training sequence assignments to the subscriber units. This can be accomplished as illustrated in FIG. 8 on the example of base station 53A.

Base station 53A has a training distribution block 70, a transceiver unit 72 and a number of antennas 74A, ..., 74X forming an adaptive antenna array. Although such adaptive antenna arrays are preferred, the method can also be employed in base station with a different antenna configuration or a single antenna system. However, as is known in the art, adaptive antenna arrays can use spatial-signature monitoring and provide for additional interference mitigation and are hence preferred for both base stations and subscriber units. Training distribution block 70 receives the training sequence assignments from signaling block 66 of BSC 60 and passes them on to transceiver unit 72. Transceiver unit 72 communicates the training sequences of potential interferers and of its own signal or signals to the subscriber units within cell 52A via antennas 74.

Although downlink communication direction is being described at this point, in uplink communication, i.e., when subscriber units are the transmitters and base stations the receivers, the situation is analogous but reversed and it is the base stations which will mitigate interference due to signals from subscriber units. Hence, base stations 53A, 53B, 53C need to know the training sequences used by the subscriber units. BSC 60 communicates to base stations 53A, 53B, 53C the training sequences to be assigned to the subscriber units and the base stations use these training sequences, received in a co-ordinated manner according to the method of the invention, to mitigate CCI. Because the positions of the subscriber units are more likely to change, and will change for mobile subscriber units, ranging between subscriber units and base stations for the purpose of determination of distances and transmission delays is required in the uplink. Whereas, for fixed subscribers ranging once in a while, or at the time of intial installation may suffice.

Figure 9:
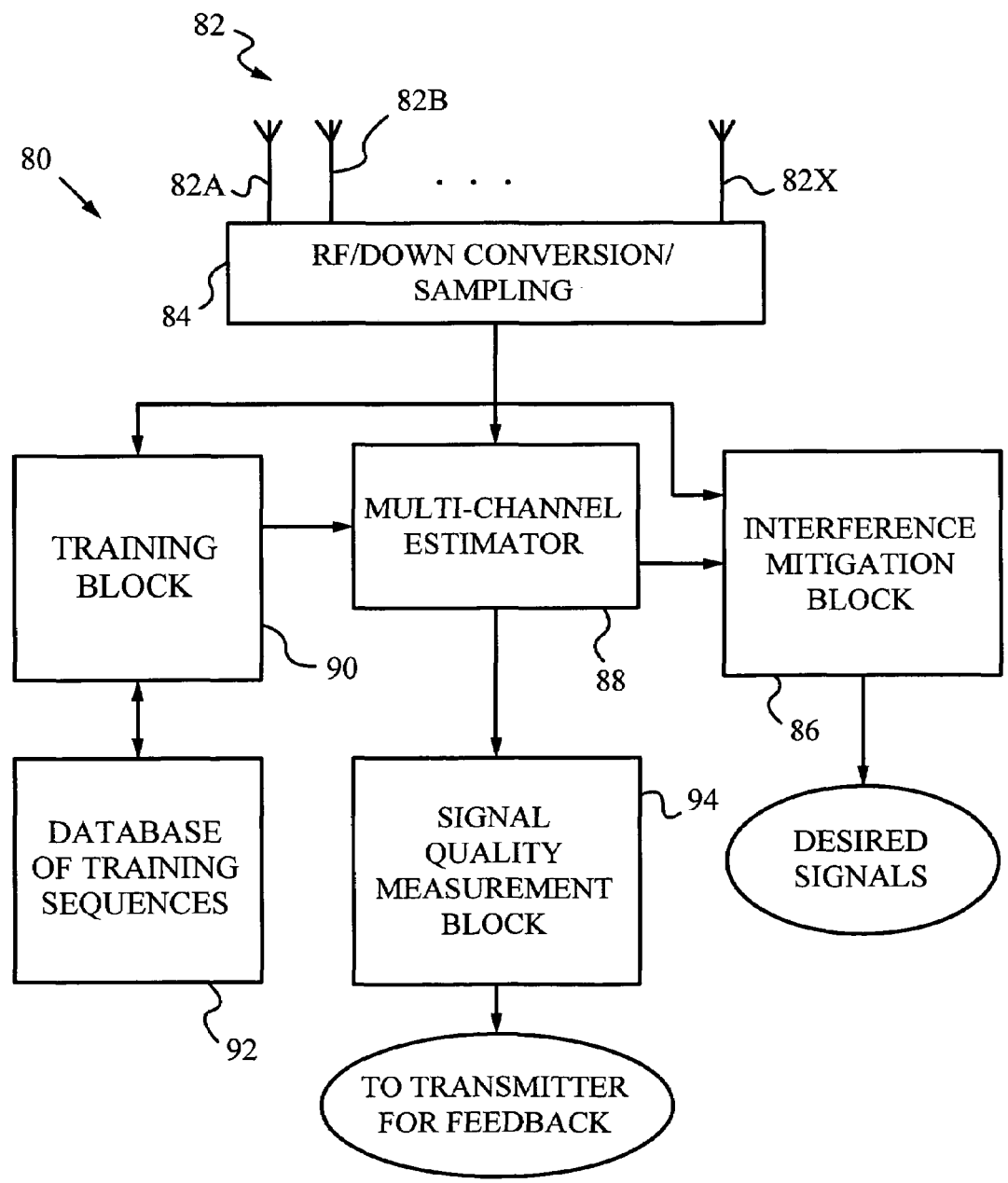
FIG. 9 is a block diagram of a subscriber unit with the requisite elements for interferer cancellation.

FIG. 9 is a block diagram of a subscriber unit 80 equipped to operate in a wireless system of the invention, e.g., in network 50. Unit 80 has an adaptive antenna array 82 consisting of antennas 82A, ..., 82X for receiving signals. An Rf/Down Conversion/Sampling circuit 84 processes the signals received by array 82 and down-converts and samples them. After down-conversion and sampling the signals are applied to an interference mitigation block 86 which regularly receives channel estimates of signals of interest and of interferers from a multi-channel estimator 88. A training block 90 which receives the training sequence information from the base station, selects the correct training sequence for each signal, e.g., signals of interest and the interferers, and supplies it to multi-channel estimator 88.

Preferably, unit 80 has its own database of training sequences 92 used in network 50 (e.g., mirroring those in database 64). In this way, the training sequences are locally available to unit 80. The training sequences can be updated or changed to reflect those in database 64 as instructed by BSC 60. Multi-channel estimator 88 uses the training sequences from training block 90 and down-converted signals to estimate the desired signal and interferer signal channels in parallel. Multi-channel estimator 88 is also connected to a signal quality measurement block 94 which analyzes the channel estimates and in conjunction with multi-channel estimator 88 measures the signal quality of the desired signals and interferers. This information is fed back to be transmitted via the base stations to feedback analyzer 68 and training controller 62 of BSC 60. Analyzer 68 and training controller 62 use signal quality feedback information to assess interference mitigation performance and assign/re-assign training sequences as described above.

Figure 10A:
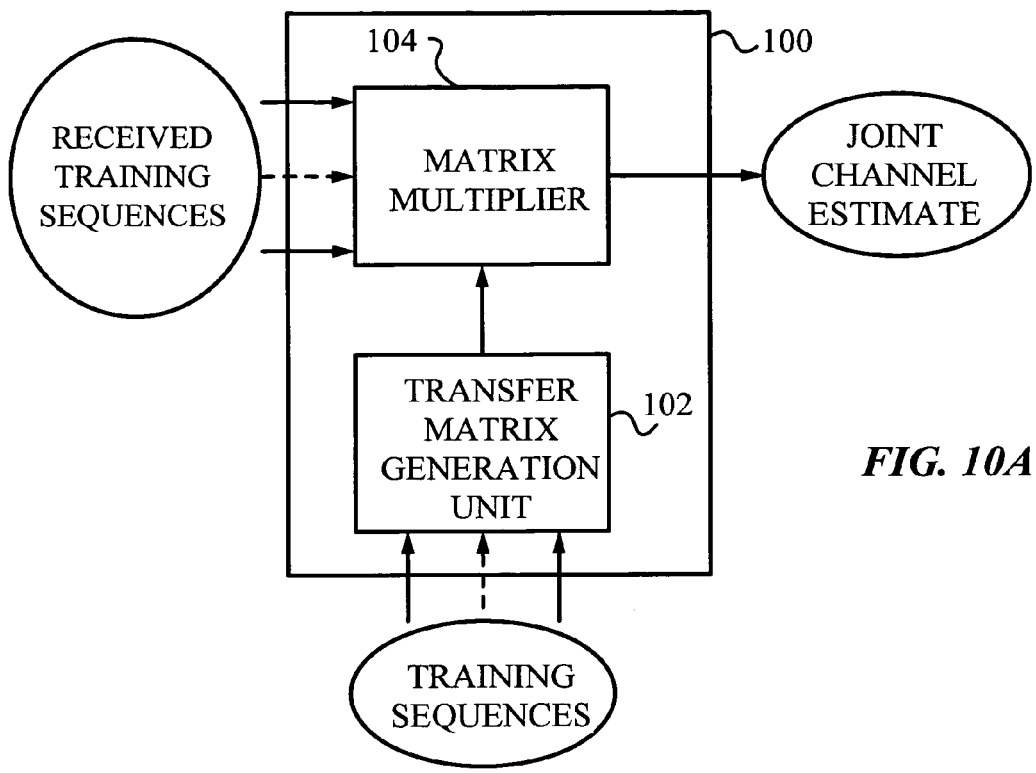
FIG. 10A is a block diagram of a multi-channel estimator.

An example of a multi-channel estimator 100 suitable for use as estimator 88 is shown in FIG. 10A. Multi-channel estimator 100 is a Multi Input Multi Output (MIMO) Space-Time channel estimator using the Least Squares approximation. The selected training sequences for the desired signals and interferers are delivered, e.g., from training block 90, to a transfer matrix generation unit 102. Unit 102 produces the transfer matrix $T^H(T \cdot T^H)^{-1}$, where T is the matrix of training sequences in which each row is a particular training sequence for a desired signal or interferer and $T^H$ is the Hermetian transpose of T.

The transfer matrix is supplied from unit 102 to a matrix multiplier 104. Matrix multiplier 104 also receives the actual signals with their training sequences from the multiple channels. These signals include useful signals and interferers. Multiplier 104 multiplies the transfer matrix by the signals to obtain a joint MIMO channel estimate which is passed on to interference mitigation such as block 86.

Figure 10B:
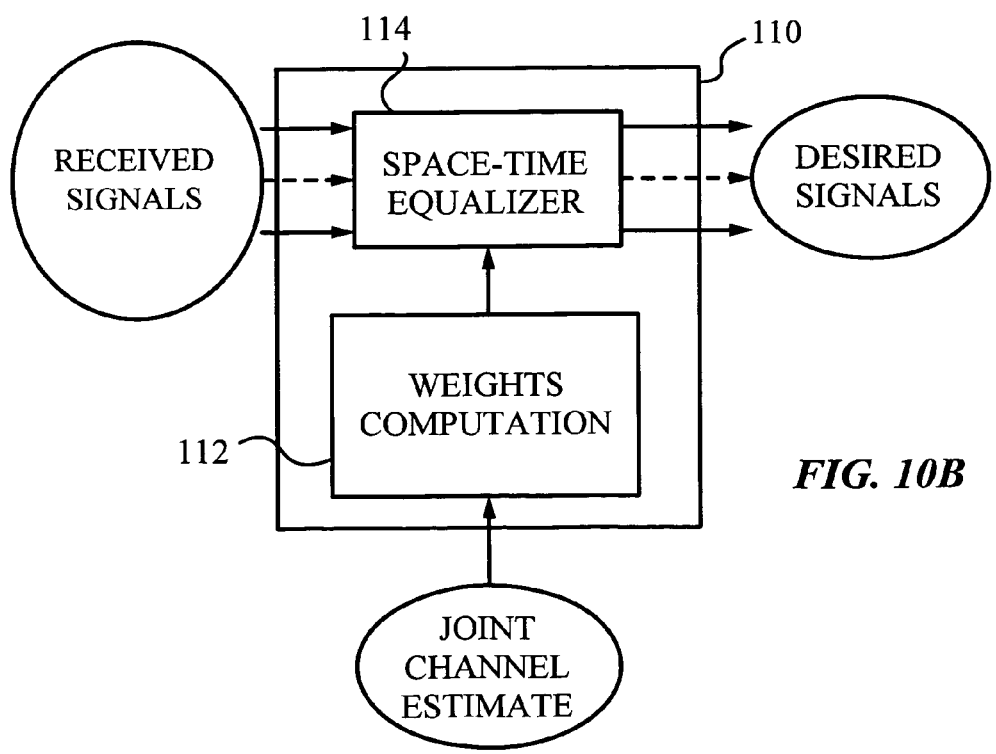
FIG. 10B is a block diagram of an interference suppression arrangement.

FIG. 10B shows an exemplary interference mitigation block 110 which can be used as block 86. The channel estimate obtained from block 100 is fed to a weights computation block 112, which computes the weights for the received signals and delivers them to a space-time equalizer 114. Equalizer 114 can be a least squares (LS), zero forcing (ZF), minimum mean square estimator (MMSE), an ML equalizer, a successive interference canceling type equalizer or any other kind of equalizer known to those skilled in the art. Equalizer 114 applies the weights from block 112 to the received signals during the data phase or portion and thus suppresses the interfering signal or signals to obtain the desired signal or signals.

Figure 11:
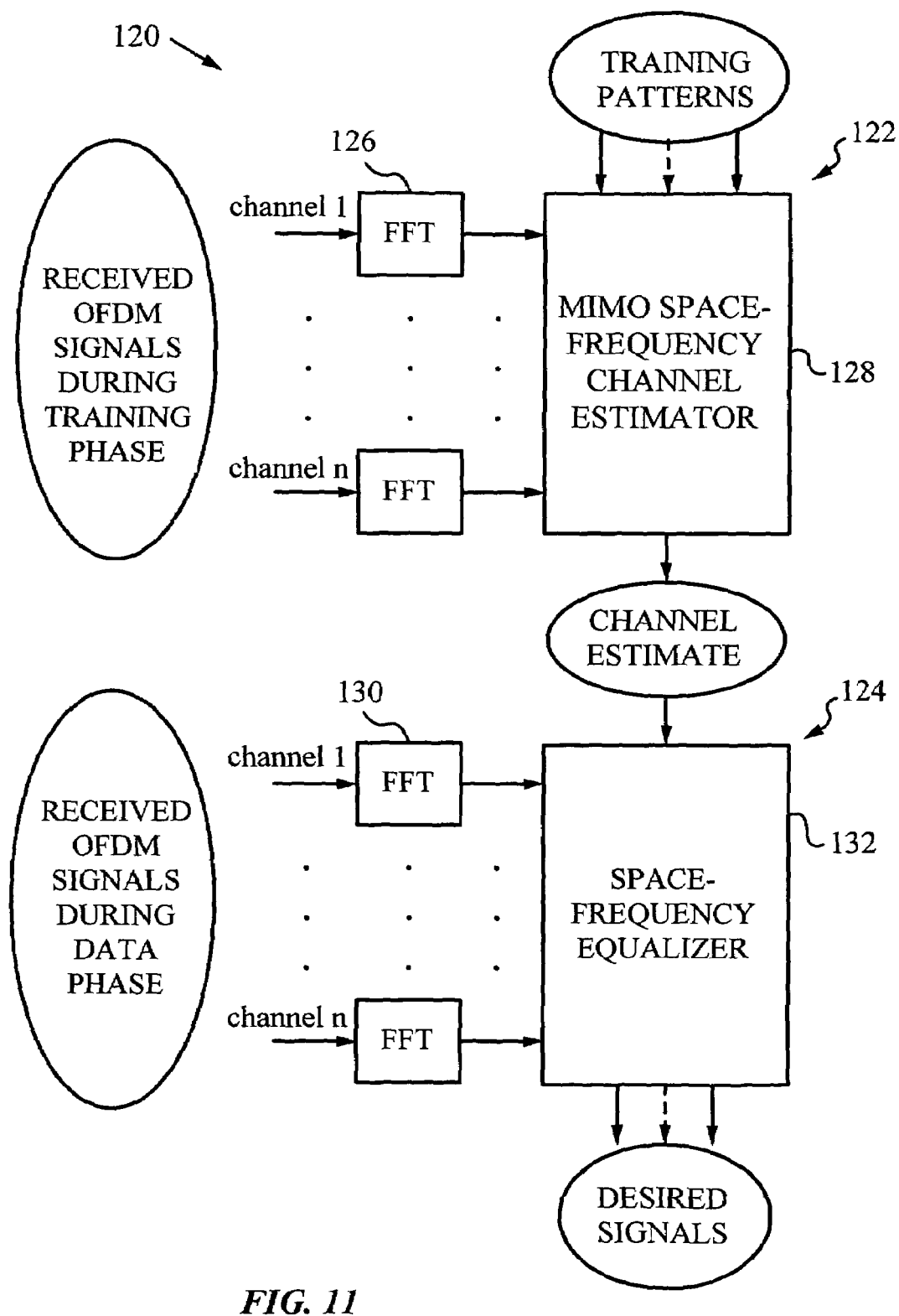
FIG. 11 is a block diagram of another embodiment of a channel estimator and interference canceler.

FIG. 11 shows yet another type of interference mitigation circuitry 120 which implements an estimator 122 and an interference canceler 124 in a space-frequency wireless system, e.g., an OFDM system. In this case the training patterns contained in the signals are particular frequency tone sets and their values. There can be a dedicated training phase during which the training patterns are transmitted and a data phase during which the data are transmitted. Alternatively, the training patterns can be transmitted along with the data by allocating a dedicated subset of data tones to the training patterns.

During the training phase the channels 1 through n of the OFDM signals are received and transformed to the frequency domain by fast Fourier transform block (FFT) 126. The transformed signals are delivered to a MIMO space-frequency channel estimator 128. Estimator 128 is also supplied with the training patterns assigned to the desired signals and the interferers. Using these inputs estimator 128 generates the joint channel estimate, which it forwards to a space-frequency equalizer 132 of interference canceler 124.

Equalizer 132 can be a least squares (LS), zero forcing (ZF), minimum mean square estimator (MMSE), an ML equalizer, a successive interference canceling type equalizer or any other kind of equalizer known to those skilled in the art. During the data phase equalizer 132 receives OFDM signals contained in channels 1 through n transformed to the frequency domain by FFT block 130. Equalizer 132 uses the joint channel estimates obtained from estimator 128 to suppress the interferers and generate the desired signals at its output.

It will be clear to one skilled in the art that the above embodiment may be altered in many ways without departing from the scope of the invention. Accordingly, the scope of the invention should be determined by the following claims and their legal equivalents.

What is claimed is:

1. A method of interference mitigation by coordinated transmission in a wireless communication system having at least a first transmitter, a second transmitter and a receiver, said receiver being located within a coverage area, said method comprising the following steps:
    a) determining a time delay between reception at a predetermined point in said coverage area that is not coincident with the first or second transmitters of a first signal $S_1$ transmitted from said first transmitter at a first frequency $f_1$ and a second signal $S_2$ transmitted from said second transmitter at said first frequency $f_1$; and
    b) introducing a transmission delay $\tau$ between the transmission of said first signal $S_1$ and the transmission of said second signal $S_2$ such that said first signal $S_1$ and said second signal $S_2$ are received coherently at said predetermined point, whereby said first signal $S_1$ and said second signal $S_2$ are received substantially coherently by said receiver, thereby aiding in interference mitigation.

2. The method of claim 1, wherein said predetermined point is located at the position of said receiver.

3. The method of claim 1, wherein said predetermined point is determined by ranging.

4. The method of claim 1, wherein said coverage area comprises a sector of a cell.

5. A wireless communication system comprising:
    a) means for transmitting a first signal $S_1$ at a first frequency $f_1$ and means for transmitting a second signal $S_2$ at said first frequency $f_1$;
    b) means located in a coverage area for receiving said first signal $S_1$ and said second signal $S_2$;
    c) means for determining a time delay between reception at a predetermined point in said coverage area of said first signal $S_1$ and of said second signal $S_2$, wherein the predetermined point is not coincident with the first transmitter or the second transmitter; and
    d) means for introducing a transmission delay $\tau$ between the transmission of said first signal $S_1$ and the transmission of said second signal $S_2$ such that said first signal $S_1$ and said second signal $S_2$ are received coherently at said predetermined point, whereby said first signal $S_1$ and said second signal $S_2$ are received substantially coherently by said means for reception, thereby aiding in interference mitigation.

6. The wireless communication system of claim 5 employing a multiple access method selected from the group consisting of TDMA, CDMA, FDMA and OFDMA.

7. In a wireless cellular communication system comprising a receiver and a plurality of base station transmitters comprising a first transmitter and a second transmitter, a method comprising:

a) determining in coordination a first transmission delay for the first transmitter and a second transmission delay for the second transmitter;
b) transmitting from the first transmitter a first signal $S_1$ at a first frequency $f_1$ in accordance with the first transmission delay;
c) transmitting from the second transmitter a second signal $S_2$ at the first frequency $f_1$ in accordance with the second transmission delay;
wherein the first and second transmission delays are determined in coordination so that the transmitted first signal and the transmitted second signal arrive at the receiver within a time δ of each other, where δ is greater than zero but less than a guard interval length used in the transmitting steps.

8. The method of claim 7 wherein the first transmission delay is determined from a first distance from the first transmitter to the receiver, and the second transmission delay is determined from a second distance from the second transmitter to the receiver.

9. The method of claim 7 wherein the first transmitter performs the step of determining the first transmission delay and the second transmission delay; and wherein the method further comprises communicating the determined first transmission delay from the first transmitter to the second transmitter.

10. The method of claim 7 wherein the first signal comprises a useful signal for the receiver; and wherein the second signal comprises an interfering signal for the receiver.

11. The method of claim 7 wherein the first transmitter operates in a first cell, and the second transmitter operates in a second cell distinct from the first cell.

12. In a wireless communication system comprising a receiver and a plurality transmitters, a method implemented at one of the receivers comprising:
a) receiving from at least one of the plurality of transmitters training sequences for useful signals and training sequences for interfering signals;
b) receiving from at least two of the plurality of transmitters the useful signals and the interfering signals;
c) cancelling out the interfering signals using the received training sequences for the useful signals and the received training sequences for the interfering signals.

13. The method of claim 12 further comprising analyzing an interference between the useful signals and the interfering signals.

14. The method of claim 12 further comprising feeding back to at least one of the plurality of transmitters a parameter representing a signal quality of the useful signal.

15. A method comprising:
introducing a transmission delay between transmission of a first signal ($S_1$) from a first transmitter and a second signal ($S_2$) from a second transmitter, both the first and second signals transmitted on a common frequency ($f_1$), wherein the transmission delay introduced between the transmission of the first signal and said second signal cause the signals to be received at a remote receiver within a time δ of each other, where δ is greater than zero but less than a guard interval length, to improve interference mitigation therein.

16. A method according to claim 15, wherein the transmission delay is based, at least in part, on one or more transmission channel conditions between each of the first and second transmitter(s) and the receiver.

17. A method according to claim 15, wherein the transmission channel conditions are characterized by measuring a time delay between receipt of the first signal and receipt of the second signal, transmitted substantially simultaneously from the first and second transmitters, respectively.

18. A method according to claim 17, wherein the time delay is measured by a remote receiver, which provides an indication of such delay to a controller of at least said first and second transmitters.

19. A method according to claim 15, wherein the transmission delay is determined based, at least in part, on an indication of a time delay from a receiver of the first and second signals transmitted substantially simultaneously from the first and second transmitters, respectively.

20. A wireless communication system comprising:
at least a first and a second transmitter, to selectively transmit an associated first and second signal, each on a common frequency ($f_1$); and
a controller, coupled with the first and second transmitters, to develop a transmission delay that when applied to the transmission of the first and the second signals cause the signals to be received at a remote receiver within a time δ of each other, where δ is greater than zero but less than a guard interval length, to improve interference mitigation therein.

21. A wireless communication system according to claim 20, wherein the controller develops the transmission delay based, at least in part, on an indication of communication channel parameter(s) provided by the remote receiver.

22. A wireless communication system according to claim 21, wherein the communication channel parameter(s) includes an indication of the time delay between receipt of a first signal and a second signal transmitted substantially simultaneously from the first and second transmitters on the common frequency.

23. A wireless communication system according to claim 20, wherein the transmitters are located in a first wireless communication station and a second wireless communication station, respectively.

24. A wireless communication system according to claim 23, wherein the controller is a base controller station.

25. A wireless communication system according to claim 20, wherein the wireless communication system is a base transceiver station.

* * * * *